US010204125B2

(12) United States Patent
Tang

(10) Patent No.: US 10,204,125 B2
(45) Date of Patent: Feb. 12, 2019

(54) METHOD, APPARATUS, AND APPLICATION PLATFORM FOR UPDATING APPLICATION OBJECT ATTRIBUTE

(71) Applicant: TENCENT TECHNOLOGY (SHENZHEN) COMPANY LIMITED, Shenzhen (CN)

(72) Inventor: Yafeng Tang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 1034 days.

(21) Appl. No.: 14/591,183

(22) Filed: Jan. 7, 2015

(65) Prior Publication Data

US 2015/0127613 A1    May 7, 2015

Related U.S. Application Data

(63) Continuation of application No. PCT/CN2014/078000, filed on May 21, 2014.

(30) Foreign Application Priority Data

Aug. 1, 2013    (CN) .......................... 2013 1 0332737

(51) Int. Cl.
  *G06F 17/30*    (2006.01)
  *G06F 8/65*    (2018.01)
  *G06F 11/14*    (2006.01)
(52) U.S. Cl.
  CPC .......... *G06F 17/30345* (2013.01); *G06F 8/65* (2013.01); *G06F 11/1448* (2013.01)
(58) Field of Classification Search
  USPC ........................................................ 707/644
  See application file for complete search history.

(56) References Cited

U.S. PATENT DOCUMENTS 6,141,660 A    10/2000    Bach et al.
7,517,282 B1 *    4/2009    Pryor ...................... A63F 13/12
                                463/1

(Continued)

FOREIGN PATENT DOCUMENTS

CN    101021877 A    8/2007
CN    101169738 A    4/2008

(Continued)

OTHER PUBLICATIONS

Taiwan Intellectual Property Office (TIPO) Office Action 1 for 103122913 dated Nov. 11, 2015 pp. 1-15.

(Continued)

*Primary Examiner* — Cheyne D Ly
(74) *Attorney, Agent, or Firm* — Anova Law Group, PLLC

(57) ABSTRACT

Methods, apparatus and application platforms for updating application object attribute are provided herein. In an exemplary method, a task for updating an attribute of an application object corresponding to an application can be established via task configuration, to obtain task configuration information of the task and form a task list. The task can be extracted from the task list. The task configuration information can be parsed, to obtain source attribute information and destination attribute information of the application. The application object can be found in a database, according to the source attribute information of the application. Current attribute information of the application object can be modified into the destination attribute information. After the modifying, the destination attribute information can be written into the database as the current attribute information of the application object.

16 Claims, 12 Drawing Sheets

(56) References Cited

U.S. PATENT DOCUMENTS

| | | | | |
|---|---|---|---|---|
| 7,877,353 B2* | 1/2011 | Ahmed | ............... | G06Q 30/02 |
| | | | | 705/26.35 |
| 7,958,019 B2* | 6/2011 | Ahmed | ............ | G06Q 30/0637 |
| | | | | 705/26.82 |
| 2008/0313024 A1* | 12/2008 | Kunichika | ............ | G06Q 10/06 |
| | | | | 705/7.15 |
| 2009/0253517 A1* | 10/2009 | Bererton | ............... | A63F 13/12 |
| | | | | 463/42 |
| 2010/0269114 A1* | 10/2010 | Li | ..................... | G06Q 10/107 |
| | | | | 718/101 |

FOREIGN PATENT DOCUMENTS

| | | |
|---|---|---|
| CN | 101296199 A | 10/2008 |
| CN | 101853167 A | 10/2010 |
| CN | 102253860 A | 11/2011 |
| CN | 102436473 A | 5/2012 |
| CN | 103023978 A | 4/2013 |

OTHER PUBLICATIONS

The World Intellectual Property Organization (WIPO) International Search Report for PCT/CN2014/078000 dated Aug. 22, 2014 pp. 1-3.
The State Intellectual Property Office of the People's Republic of China (SIPO) Office Action 1 for 201310332737.9 dated Jun. 14, 2018 8 Pages (including translation).

* cited by examiner

| Manage product | > | Online game automated trading | > | Region/ server merger | > | Add task |

● Select game and merger type

Game name [ QQ Faerie ▼ ]

Merger type [ Server merger ☑ ] [ Great-region merger ]

● Select region/server to be merged

[ Add merger ] [ Merge ]

Original server information　　　　　　　　　　　New server information

Original great-region name　Original server name　　　　New great-region name　New server name
[　　　　] [　　　　] [Add server to be merged] [　　　　] [　　　　]
Original great-region ID　Original server ID　　　　　　New great-region ID　　New server ID
[　　　　] [　　　　]　　　　　　　　　　　　　　　[　　　　] [　　　　]

[ Delete merger ]

Original server information　　　　　　　　　　　New server information

Original great-region name　Original server name　　　　New great-region name　New server name
[　　　　] [　　　　] [Add server to be merged] [　　　　] [　　　　]
Original great-region ID　Original server ID　　　　　　New great-region ID　　New server ID
[　　　　] [　　　　]　　　　　　　　　　　　　　　[　　　　] [　　　　]

[ Delete merger ]

METHOD, APPARATUS, AND APPLICATION PLATFORM FOR UPDATING APPLICATION OBJECT ATTRIBUTE

CROSS-REFERENCES TO RELATED APPLICATIONS

This application is a continuation application of PCT Patent Application No. PCT/CN2014/078000, filed on May 21, 2014, which claims priority to Chinese Patent Application No. 201310332737.9, filed on Aug. 1, 2013, the entire contents of which are incorporated herein by reference.

FIELD OF THE DISCLOSURE

The present disclosure generally relates to Internet technology and, more particularly, relates to methods, apparatus, and application platforms for updating application object attribute.

BACKGROUND

Online game trading platform, as an automated trading platform for online game items or roles, enables a game player to release merchandise or product directly on the platform, and to purchase on the platform merchandise released by another game player. Transfer of game items or roles is all done automatically without intervention of a third party.

Merchandise released by a game player on an online game trading platform has an attribute, including region and server. The attribute of the merchandise needs to be maintained consistent with the attribute within a game in order to ensure normal transactions. Typically, due to operational needs of the online game, from time to time, certain regions (or servers) are merged into one region (or server), and such operation is called a region/server merger. In this case, the region/server of merchandise that belongs to the merged regions (or servers) needs to be consistent with the region/server within the game. Therefore, the region/server of the merchandise needs to be merged along with the regions/servers within the game.

Conventionally, the region/server merger of merchandise is mainly operated by a developer. First, the developer obtains information of a region/server merger from a carrier. Next, the developer operates a database, backs up data, then manually modifies region/server information of the merchandise, and verifies the region/server information of the merchandise after the modification. Such a manual operating process consumes significant time and labor. In addition, manually operating the database is subject to tremendous data security risks. The disclosed methods, apparatus, and application platforms are directed to solve one or more problems set forth above and other problems,

BRIEF SUMMARY OF THE DISCLOSURE

One aspect of the present disclosure includes methods for updating application object attribute. An exemplary method can be implemented on an application platform. A task for updating an attribute of an application object corresponding to an application can be established via task configuration, to obtain task configuration information of the task and to form a task list. The task can be extracted from the task list. The task configuration information can be parsed, to obtain source attribute information and destination attribute information of the application. The application object can be found in a database, according to the source attribute information of the application. The application object can have current attribute information corresponding to the source attribute information of the application. The current attribute information of the application object can be modified into the destination attribute information. After the modifying, the destination attribute information can be written into the database as the current attribute information of the application object.

Another aspect of the present disclosure includes an apparatus for updating application object attribute. The apparatus can include a task-establishing module, an extracting-parsing module, a finding module, a modifying module, and a writing module. The task-establishing module can be configured to establish a task for updating an attribute of an application object corresponding to an application, via task configuration, to obtain task configuration information of the task and to form a task list. The extracting-parsing module can be configured to extract the task from the task list and parse the task configuration information, to obtain source attribute information and destination attribute information of the application. The finding module can be configured to find the application object in a database, according to the source attribute information of the application, wherein the application object has current attribute information corresponding to the source attribute information of the application. The modifying module can be configured to modify the current attribute information of the application object into the destination attribute information. The writing module can be configured to write the destination attribute information into the database after the modifying as the current attribute information of the application object.

Another aspect of the present disclosure includes a non-transitory computer-readable medium having computer program. When being executed by a processor, the computer program performs a method for updating application object attribute. The method includes establishing a task for updating an attribute of an application object corresponding to an application, via task configuration, to obtain task configuration information of the task and to form a task list, and extracting the task from the task list and parsing the task configuration information, to obtain source attribute information and destination attribute information of the application. The method also includes finding the application object in a database, according to the source attribute information of the application, wherein the application object has current attribute information corresponding to the source attribute information of the application. Further, the method includes modifying the current attribute information of the application object into the destination attribute information and, after the modifying, writing the destination attribute information into the database as the current attribute information of the application object.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the disclosure.

FIG. 2B depicts another exemplary interface for adding a task in an online game in accordance with various disclosed embodiments;

FIG. 2C depicts another exemplary interface for adding a task in an online game in accordance with various disclosed embodiments;

FIG. 2D depicts an exemplary interface of a task list in an online game in accordance with various disclosed embodiments;

DETAILED DESCRIPTION

Reference will now be made in detail to exemplary embodiments of the disclosure, which are illustrated in the accompanying drawings.

Figure 11:
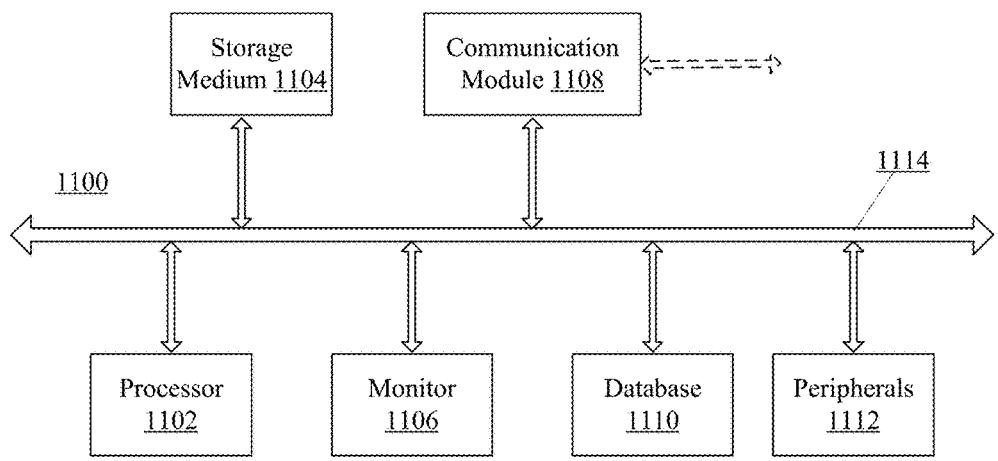
FIG. 11 depicts an exemplary computer system consistent with the disclosed embodiments.

FIG. 11 shows a block diagram of an exemplary computer system 1100 capable of implementing methods, apparatus and platforms in accordance with various embodiments disclosed herein. As shown in FIG. 11, the exemplary computer system 1100 may include a processor 1102, a storage medium 1104, a monitor 1106, a communication module 1108, a database 1110, peripherals 1112, and one or more bus 1114 to couple the devices together. Certain devices may be omitted and other devices may be included.

The processor 1102 can include any appropriate processor or processors. Further, the processor 1102 can include multiple cores for multi-thread or parallel processing. The storage medium 1104 may include memory modules, e.g., Read-Only Memory (ROM), Random Access Memory (RAM), and flash memory modules, and mass storages, e.g., CD-ROM, U-disk, removable hard disk, etc. The storage medium 1104 may store computer programs for implementing various processes (e.g., obtaining attribute information, establishing task, modifying attribute information, etc.), when executed by the processor 1102.

The monitor 1106 may include display devices for displaying contents in the computer system 1100, e.g., displaying attribute information, task configuration information, task list, or game interface. The peripherals 1112 may include I/O devices such as keyboard and mouse, e.g., for triggering task-adding instructions, inputting task configuration information, or operating task list.

Further, the communication module 1108 may include network devices for establishing connections through any appropriate communication network. The database 1110 may include one or more databases for storing certain data and for performing certain operations on the stored data, e.g., storing attribute information of application object, storing attribute information within an application, etc.

Figure 1:
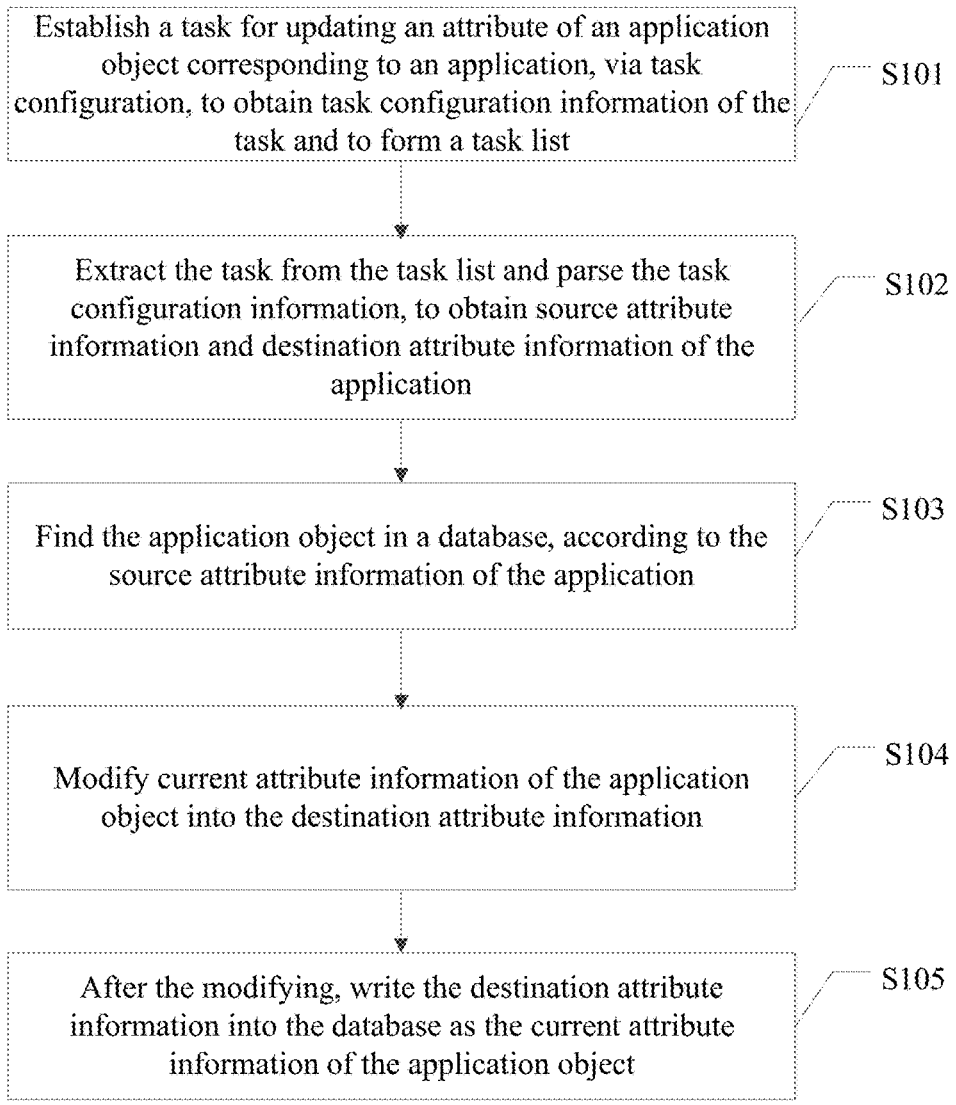
FIG. 1 depicts a flow diagram of an exemplary method for updating application object attribute in accordance with various disclosed embodiments.

Various embodiments provide methods, apparatus and application platforms for updating application object attribute. The methods can be implemented by an apparatus for updating application object attribute, or by an application platform for updating application object attribute. FIG. 1 depicts a flow diagram of an exemplary method for updating application object attribute in accordance with various disclosed embodiments. The method can include the following exemplary steps.

In Step S101, a task for updating an application object attribute is established via task configuration, to form a task list. In various embodiments, during an operating process of a network application, e.g., an online game, when an application attribute is changed, an attribute of an object of the application needs to be changed accordingly. Thus, during the operating process of the network application, when a transfer of an application object (e.g., transaction of game items or roles) needs to be performed, the transfer can be ensured to be performed normally.

For illustrative purposes, in various embodiments, a network application can be an online game. Game items or roles of the online game can be the application objects of the online game. An application platform can refer to an environment within which an application is designed to run. The application platform can include one or more computer systems having appropriate coded instructions thereon. For example, the application platform can be an apparatus that is a terminal device, a server, or any other appropriate devices.

For a certain online game, multiple regions or servers can be used to provide the game respectively for certain group of game players to play. Region can refer to, but is not limited to, geographic region. Server can refer to, but is not limited to, a certain server that operates part or all of the application. A region can include multiple servers. Alternatively, a server can include multiple regions. Definition of region and server, relationship or hierarchy between region and server, number of regions and servers within a game, or any other specific information of region and server can be varied depending on needs of actual applications, without limitation.

The regions or servers used by the game can be referred to attributes within the game. The names, identifications (IDs), relationships, hierarchy, or any other information of the regions and servers can be referred to as attribute information within the game. Attribute information can be of various attribute types. For example, attribute information related to regions within the game can be referred to as attribute information of 'region' attribute type corresponding to the game. Similarly, attribute information related to servers within the game can be referred to as attribute information of 'server' attribute type corresponding to the game.

An application object of the game can have one or more attributes. The attributes of an application can include, e.g., server, and/or region that the application object corresponds to or belongs to.

As used herein, wherever applicable, attribute of an application object can also be referred to as an application object attribute. Attribute within an application can also be referred to as an application attribute. 'Application object' can be used interchangeably with 'object'.

Attribute information within a game can be modified in various ways. That is, there can be various types of application attribute modification. For example, when a server or a region is merged, the application attribute modification can be a merger, the type of the application attribute modification (i.e., type of the merger) can include a server merger, or a region merger. As used herein, wherever applicable, 'type of application attribute modification' can also be referred to as 'attribute modification type of application'.

Online game trading platform, as an automated trading platform for merchandise, (including, e.g., online game items or roles), enables a game player to release merchandise or product directly on the platform, and to purchase on the platform merchandise released by another game player. Transfer of game items or roles is all done automatically without intervention of a third party. Merchandise released by a game player on an online game trading platform has an attribute, including region and server. The attribute needs to be maintained consistent with an attribute within a game in order to ensure normal transactions.

Typically, due to operational needs of the online game, from time to time, certain regions (or servers) are merged into one region (or server), and such operation is called a region/server merger. For example, operation of merging a region into another region is a region merger, and operation of merging a server into another server is a server merger. After a region/server merger, the region/server of merchandise that belongs to the merged regions (or servers) needs to be consistent with the region/server within the game. Therefore, the region/server of the merchandise needs to be merged along with the regions/servers within the game.

Therefore, application object attribute may need to be modified or updated. In order to achieve the modifying or updating of the application object attribute according to a change in an application attribute, in one embodiment, a task for updating an application object attribute is established for an application via task configuration, to form a task list. When the task is subsequently performed, the application object attribute can be automatically modified corresponding to the change in the application attribute. The task configuration can refer to a process or operation for providing task configuration needed for establishing the task.

During the establishing of the task, depending on various attribute modifications, the task for each application can include multiple sub-tasks. For example, during the region/server merger in online games, for a certain type of online game, the attribute modifications can include server merger(s) (i.e., merging servers), or region merger(s) (i.e., merging regions).

Take server merger as an example. The task can include merging one server into another server, or merging multiple servers into other server(s). The task can include multiple sub-tasks in parallel. Each sub-task can include merging one server into another server, or merging multiple servers into other server(s).

During the task configuration, a user can trigger a task-adding instruction on an operation interface of an application platform, e.g., via a user terminal. For example, the user terminal can be an apparatus for updating application object attribute. In various embodiments, the operation interface of the application platform can be displayed on the user terminal. In response to the task-adding instruction triggered by the user via the user terminal, the application platform can configure the task according to the task-adding instruction, and obtain task configuration information. The task configuration information can include application name, type of application attribute modification, source attribute information and destination attribute information of attribute type corresponding to the application. The destination attribute information can refer to the attribute information that can be used to replace the source attribute information during the attribute modification.

During actual operation, via various option buttons provided on the operation interface of the application platform, the user can perform the task configuration and select the application name, the type of application attribute modification, and/or the source attribute information and the destination attribute information of the attribute type corresponding to the application. Further, as needed, additional option buttons can be provided on the operation interface of the application platform. The additional option buttons can include, e.g., an option button to add source attribute information of the attribute type corresponding to the application to be modified (e.g. for adding a to-be-modified or to-be-merged server), and/or an option button to add source attribute information and/or destination attribute information of the attribute type corresponding to the application to be modified (e.g. for adding a sub-task for server merger).

Figure 2A:
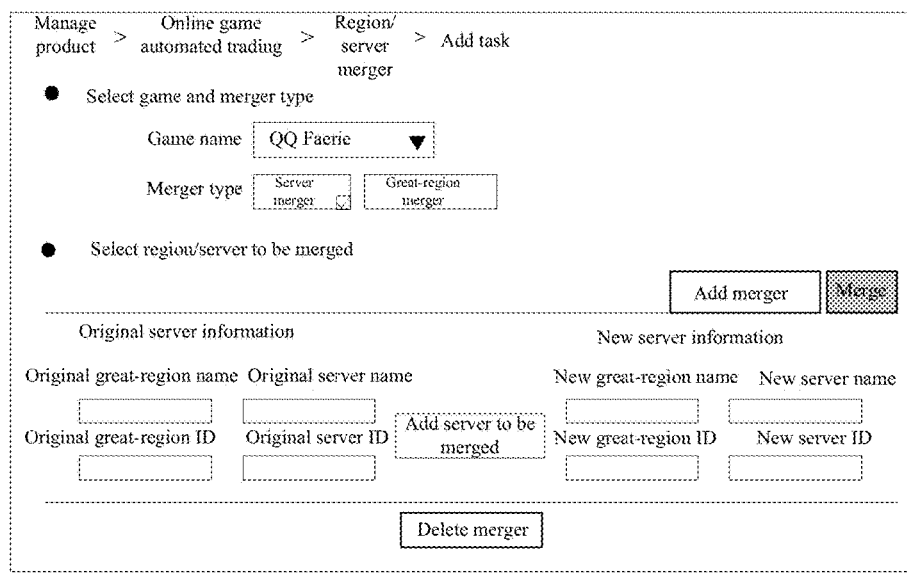
FIG. 2A depicts an exemplary interface for adding a task in an online game in accordance with various disclosed embodiments.

For illustrative purpose, FIG. 2A depicts an exemplary interface for adding a task in an online game in accordance with various disclosed embodiments. A game name and a merger type can be selected. In various embodiments, an exemplary interface as described in the present disclosure (e.g., as shown in FIGS. 2A-2D) can be a page displayed on a monitor of the computer system.

For example, the game name can be selected to be QQ Faerie, e.g., selected via a drop-down button. The merger type can be selected to be a server merger or a great-region merger, e.g., selected via a check-mark key. In this case, 'great region' can be an attribute that is used similarly as 'region'.

Then, attribute information of region(s)/server(s) to be merged can be selected. The attribute information can include source attribute information and destination attribute information of the corresponding application. The attribute information can include region name(s), region ID(s), server name(s), server ID(s), and/or any other appropriate information. Depending on the merger type, attribute information can include information related to region, and/or server, without limitation. For example, when a region includes multiple servers, during a server merger, the attribute information required to establish a task may require name and ID of a server, and name and ID of a region that the server belongs to (e.g., as shown in FIG. 2A), in order to identify the server.

As used in FIGS. 2A-2D, source attribute information can include attribute information before the attribute information modification, and can be referred to as original attribute information. Destination attribute information can include attribute information before the attribute information modification, and can be referred to as new attribute information.

Next, the task configuration information can be stored via a merge button. A task for updating an application object attribute can thus be established. That is, in this case, a task for updating region/server attribute for the game can thus be established.

Additional sub-tasks can be added via an 'add merger' option button provided on the operation interface of the application platform. For example, FIG. 2B depicts another exemplary interface for adding a task in an online game after adding a sub-task, in accordance with various disclosed embodiments. The process for configuring the task configuration information for each task can be similar to or the same as the process of obtaining task configuration information as described above, e.g., as shown in FIG. 2A.

Figure 2C:
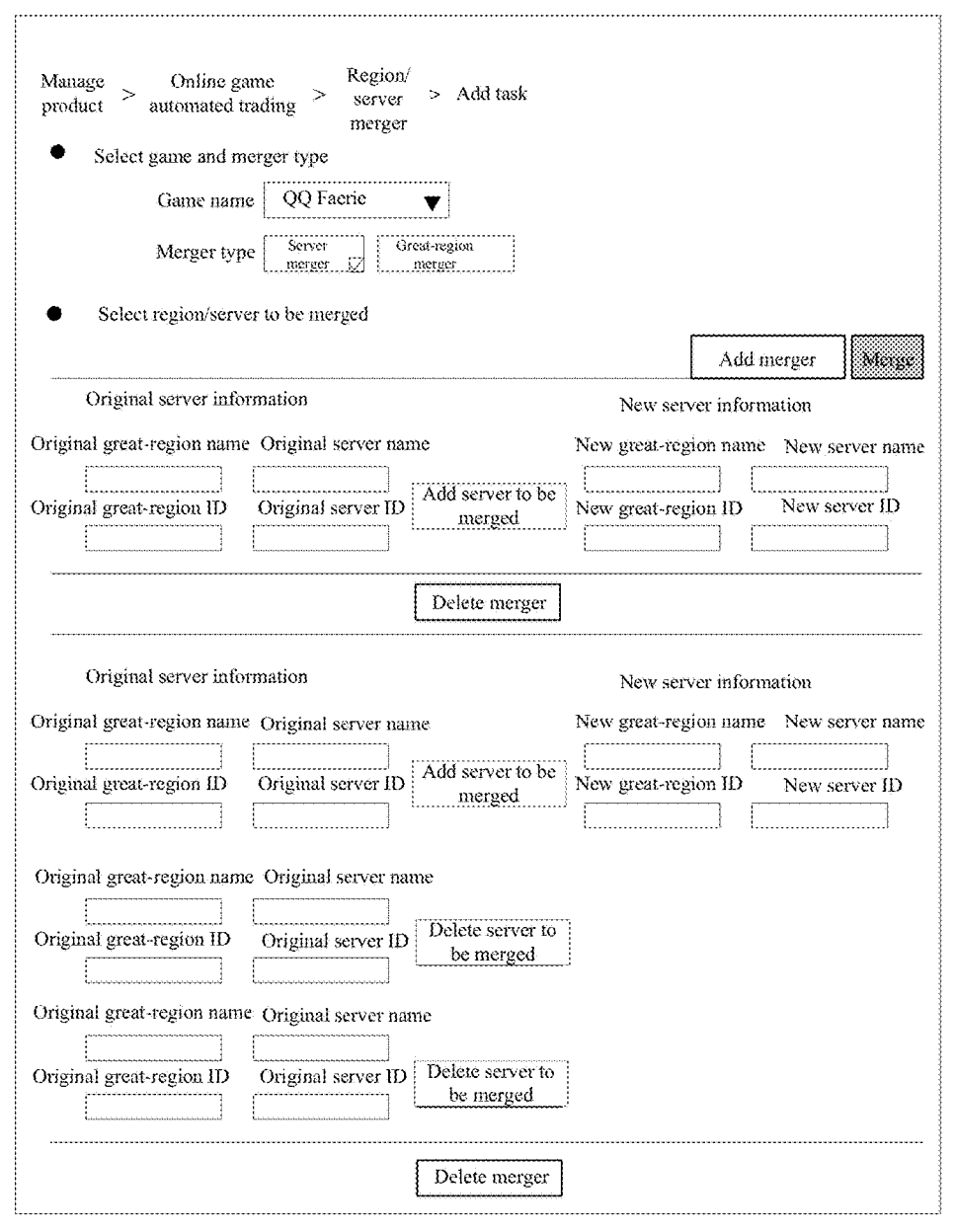

During the process of establishing the task as described above, when multiple regions/servers are to be merged into one region/server, additional region/server attribute information can be added via an 'add region/server to be merged' option button provided on the operation interface of the application platform. For example, FIG. 2C depicts another exemplary interface for adding a task in an online game, after adding servers to be merged, in accordance with various disclosed embodiments.

Furthermore, option buttons for deleting merger and/or option buttons for deleting region/server to be merged can be provided on the operation interface, in order to prevent false operation of the user or to meet various modification requirements of the user. With the method as disclosed above, a series of tasks can be established, to form a task list. For example, FIG. 2D depicts an exemplary interface of a task list in an online game in accordance with various disclosed embodiments.

In Step S102, each task is extracted from the task list, and the task configuration information of the each task is parsed to obtain the source attribute information and the destination attribute information of the corresponding application.

Figure 2D:
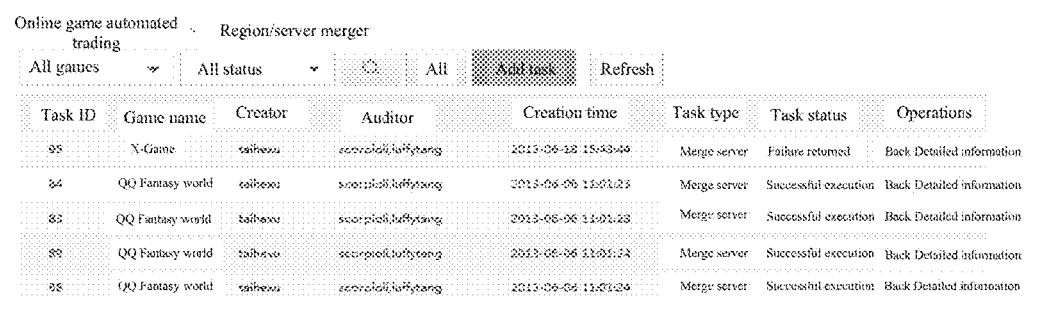

As shown in FIG. 2D, when the tasks are executed, multiple tasks, e.g., tasks for merger, can be executed simultaneously. Alternatively, the tasks can be executed one by one.

During the executing of the task, the application platform can extract the task from the task list, parse the task configuration information of the task, and obtain the source attribute information and the destination attribute information of the corresponding application. Thus, all the objects of the corresponding application can be subsequently found in a database according to the source attribute information of the corresponding application. The application object can have current attribute information corresponding to the source attribute information of the application. Furthermore, the source attribute information of all the objects of the corresponding application can be modified into the destination attribute information.

In Step S103, application object(s) corresponding to the application are found in a database according to the source attribute information of the application. In Step S104, current attribute information of the application objects is modified into the destination attribute information. In Step S105, the destination attribute information after the modification (e.g., as in Step S104) is re-written into, and stored in, the database to be used as the current attribute information of the application objects.

During Steps S103-S105, after the source attribute information and the destination attribute information of the corresponding application is obtained, the application object(s) corresponding to the application can be found in the database according to the source attribute information of the application. Further, source attribute information of the application objects of the application can be modified into the destination attribute information. Then, the destination attribute information after the modification can be re-written to the database to be used as the current attribute information of the application objects. Thus, modification of attribute information of the application objects can be completed.

An interface or page during the executing of the task can be, e.g., similar to or the same as shown in FIG. 2D. The interface of the task list can display ID of a task that is currently being executed, application name (e.g., game name), task creation time, task type (i.e., type of application attribute modification), task status, and/or other appropriate information. The interface of the task list can provide 'Operation' options for the user to operate. For example, in the 'Operation' options, the user can select a 'back' option button to implement a Back operation, to revoke a previous task execution process. Further, via the 'Operation' options, the user can obtain detailed information of execution of the tasks.

The task status can display execution status of the task, i.e., task status, including, e.g., successful execution, failure returned, or any other appropriate status. In addition, an 'add task' option can be provided on the interface of the task list. Therefore, during the execution of the task, other task(s) that need to be executed can continue to be added.

In various embodiments as disclosed above, a task for updating an application object attribute can be established via task configuration. The task can be executed according to task configuration information. Attribute information of application objects can be automatically modified. Thus, efficiency of updating the application object attribute can be improved. In addition, by timely modifying the attribute information of the application objects, the attribute information of the application objects can be maintained consistent with the attribute information within the application. As a result, subsequent transfer of application objects on the application platform can be ensured to be normally performed. Reliability of application operation can thus be improved.

Figure 3:
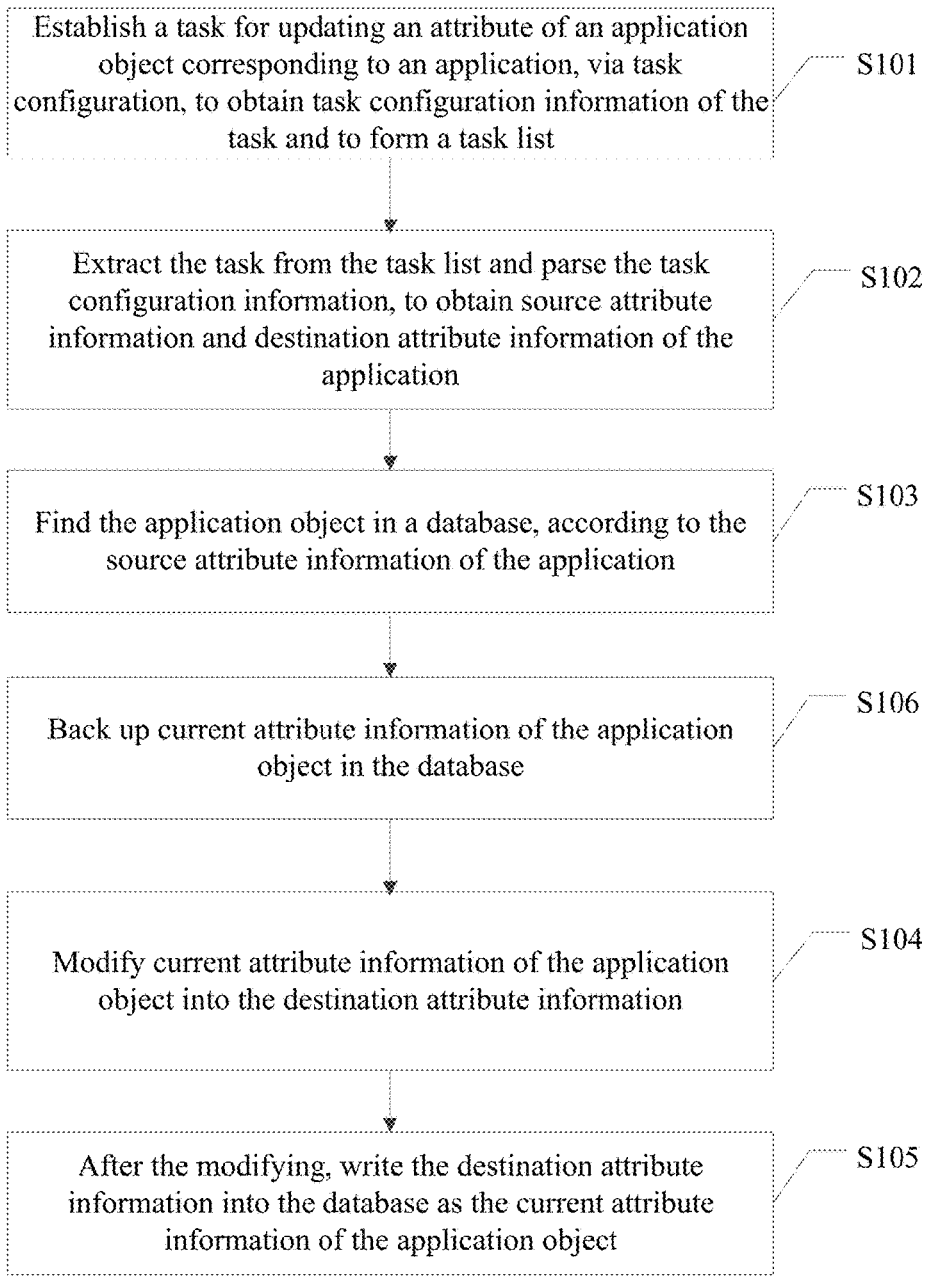
FIG. 3 depicts a flow diagram of another exemplary method for updating application object attribute in accordance with various disclosed embodiments.

FIG. 3 depicts a flow diagram of another exemplary method for updating application object attribute in accordance with various disclosed embodiments. In addition to the methods as disclosed in various embodiments (e.g., as shown in FIG. 1), after Step S103, the method can further include Step S106. In Step S106, current attribute information of the corresponding application objects in the database is backed up.

In this case, after the application object(s) corresponding to the application are found in the database according to the source attribute information of the application, and before the attribute information of the application objects is modified, current attribute information of the application objects is backed up in the database as back-up information. Thus, when a Back operation is subsequently needed, the current attribute information of the application objects can be restored based on the backed-up information, to ensure the Back operation can be performed normally.

In various embodiments as disclosed above, a task for updating an application object attribute can be established via task configuration. The task can be executed according to task configuration information. Attribute information of application objects can be automatically modified. Thus, efficiency of updating the application object attribute can be improved. In addition, by timely modifying the attribute information of the application objects, the attribute information of the application objects can be maintained consistent with the attribute information within the application. As a result, subsequent transfer of application objects on the application platform can be ensured to be normally performed. Reliability of application operation can thus be improved.

In addition, when the application object(s) corresponding to the application are found in the database according to the source attribute information of the application, and before the attribute information of the application objects is modified, current attribute information of the application objects is backed up in the database. Thus, when a Back operation is subsequently needed, the current attribute information of the application objects can be restored based on the backed-up information, to ensure the Back operation can be performed normally.

Figure 4:
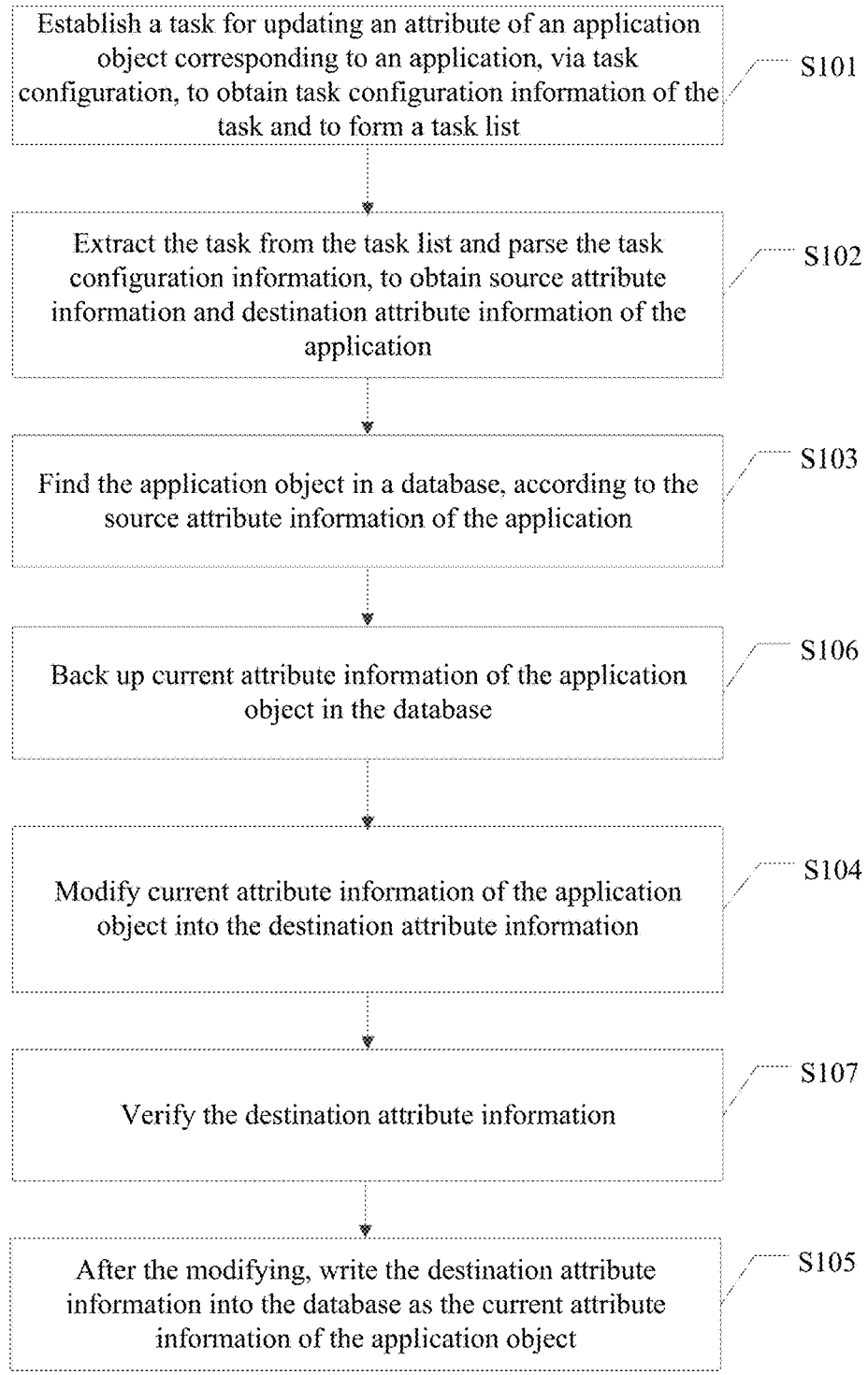
FIG. 4 depicts a flow diagram of another exemplary method for updating application object attribute in accordance with various disclosed embodiments.

FIG. 4 depicts a flow diagram of another exemplary method for updating application object attribute in accordance with various disclosed embodiments. In addition to the methods as disclosed in various embodiments (e.g., as shown in FIG. 1 or 3), after Step S104, the method can further include Step S107. In Step S107, the destination attribute information is verified.

In this case, after the attribute information of the application objects is modified, the attribute information that is modified into the destination attribute information can be verified, to ensure accuracy of data of the application and further improve the reliability of application operation.

Figure 5:
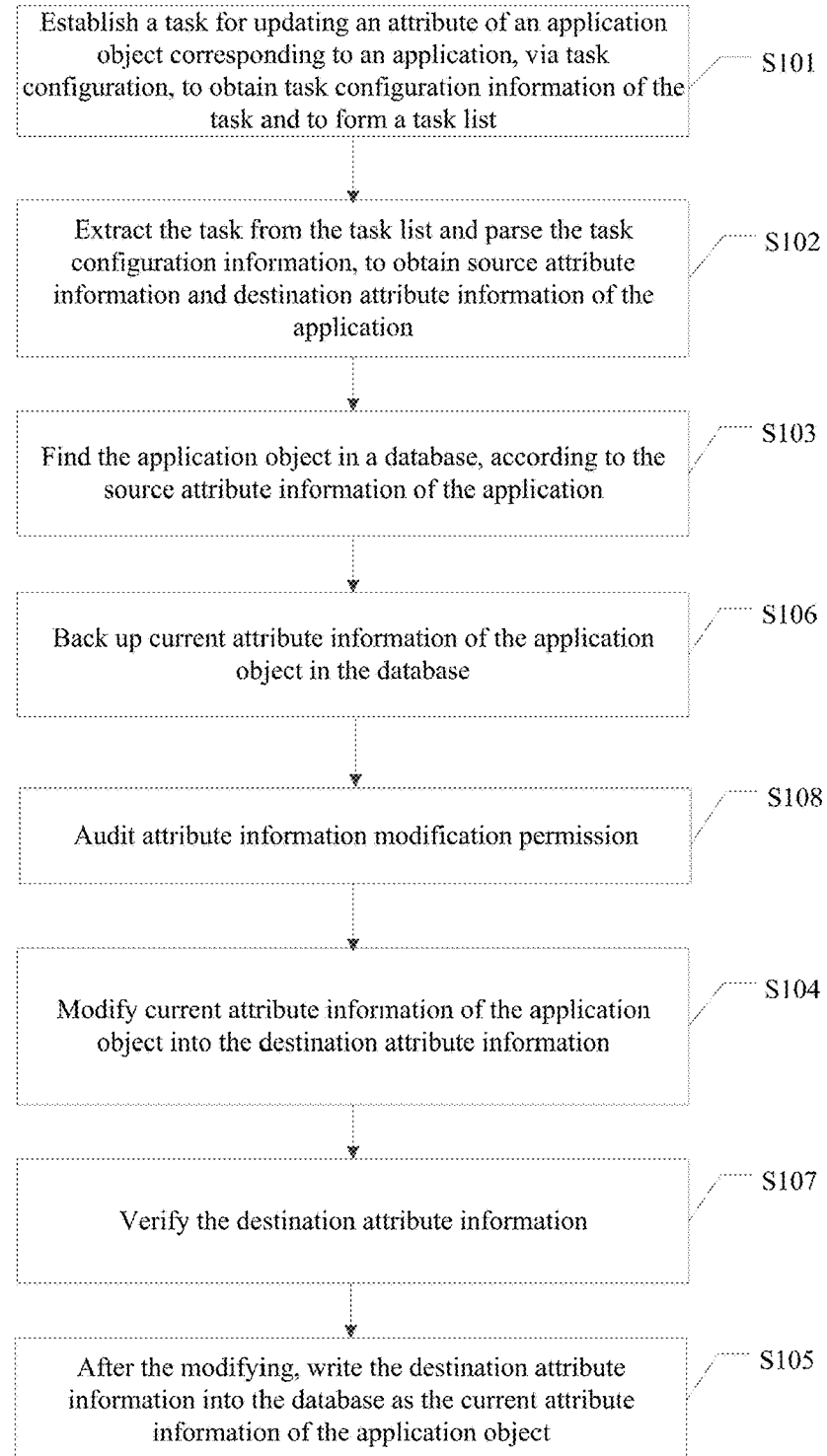
FIG. 5 depicts a flow diagram of another exemplary method for updating application object attribute in accordance with various disclosed embodiments.

FIG. 5 depicts a flow diagram of another exemplary method for updating application object attribute in accordance with various disclosed embodiments. In addition to the methods as disclosed in various embodiments (e.g., as shown in FIG. 1, 3 or 4), before Step S104, the method can further include Step S108. In Step S108, permission for attribute information modification is audited. For example, the auditing can be performed by an administrator or other operator that has high-level permission that can manage and audit the permission for the attribute information modification of a user or operator who intends to update attribute information of application object.

In this case, before the attribute information of the application objects is modified, the permission for the attribute information modification can be audited, in order to prevent false operation of information modification and improve security of task operation.

In various embodiments as disclosed above, a task for updating an application object attribute can be established via task configuration. Each task can be executed according to task configuration information. Attribute information of application objects can be automatically modified. Thus, efficiency of updating the application object attribute can be improved. In addition, by timely modifying the attribute information of the application objects, the attribute information of the application objects can be maintained consistent with the attribute information within the application. As a result, subsequent transfer of application objects on the application platform can be ensured to be normally performed. Reliability of application operation can thus be improved.

In addition, an audit mechanism can be introduced into modification of attribute information. Thus, tasks can be performed with greater security and data security of network applications can be improved accordingly.

In an online game, the region/server merger of merchandise is mainly operated by a developer. First, the developer obtains information of a region/server merger from a carrier. Next, the developer operates a database, backs up data, then manually modifies region/server information of the merchandise, and verifies the region/server information of the merchandise after the modification. Such a manual operating process consumes significant time and labor. In addition, manually operating the database is subject to tremendous data security risks.

Via task configuration and mouse-clicking operations performed by an operator, the disclosed methods can automatically complete region/server merger of merchandise including data backup, data modification, data verification and any other appropriate steps. Furthermore, because the method can include an audit mechanism, the tasks can be executed with greater security.

Figure 6:
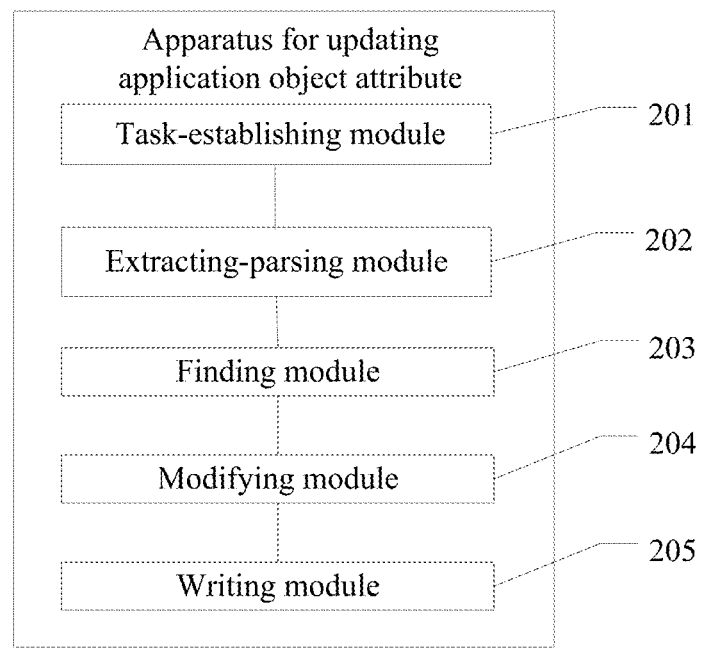
FIG. 6 depicts a structure diagram of functional modules of an exemplary apparatus for updating application object attribute in accordance with various disclosed embodiments.

FIG. 6 depicts a structure diagram of functional modules of an exemplary apparatus for updating application object attribute in accordance with various disclosed embodiments. The apparatus can include a task-establishing module 201, an extracting-parsing module 202, a finding module 203, a modifying module 204, and/or a writing module 205. Certain modules may be omitted and other modules may be included.

The task-establishing module 201 is configured to establish a task for updating an application object attribute via task configuration, to form a task list. The extracting-parsing module 202 is configured to extract each task from the task list, and parse task configuration information of the each task, to obtain source attribute information and destination attribute information of the corresponding application.

The finding module 203 is configured to look up and find corresponding application object(s) in a database, according to the source attribute information of the application. The modifying module 204 is configured to modify current attribute information of the corresponding application objects into the destination attribute information. The writing module 205 is configured to re-write or write the destination attribute information after the modification into the database to be used as the current attribute information of the application objects.

In various embodiments, during an operating process of a network application, e.g., an online game, when an application attribute is changed, an attribute of an object of the application needs to be changed accordingly. Thus, during the operating process of the network application, when a transfer of an application object (e.g., transaction of game items or roles) needs to be performed, the transfer can be ensured to be performed normally.

For illustrative purposes, in one embodiment, an application can be an online game. Game items or roles of the online game can be the application objects of the online game.

Online game trading platform, as an automated trading platform for online game items or roles, enables a game player to release merchandise or product directly on the platform, and to purchase on the platform merchandise released by another game player. Transfer of game items or roles can be done automatically without intervention of a third party. Merchandise released by a game player on an online game trading platform has attributes, including region and server. The attributes need to be maintained consistent with attributes within a game in order to ensure normal transactions.

Typically, due to operational needs of the online game, from time to time, certain regions (or servers) are merged into one region (or one server), and such operation is called a region/server merger. In this case, the region/server of the merchandise that belongs to the merged regions (or servers)

needs to be consistent with the region/server within the game. Therefore, the region/server of the merchandise needs to be merged along with, i.e., according to, the region/server within the game.

Therefore, application object attribute may need to be modified or updated. In order to modify or update application object attribute according to the region/server within the application, game of the merchandise needs to be merged along with the region/server within the game.

In order to achieve the application object attributes follow the changes in the properties of the modified application updates, the task-establishing module 201 can establish a task for updating an application object attribute for each application via task configuration, to form a task list. When a corresponding task is subsequently executed, the application object attribute can be automatically modified corresponding to the change in the application attribute.

During the establishing of the task, depending on various attribute modifications, the task of each application can include multiple sub-tasks. For example, during a region/server merger in online games, for a certain type of online game, the attribute modifications can include server merger(s) (i.e., merging servers), and/or region merger(s) (i.e., merging regions).

Take server merger as an example. The task can include merging one server into another server, or merging multiple servers into other server(s). The task can include multiple sub-tasks in parallel. Each sub-task can include merging one server into another server, or merging multiple servers into other server(s).

During the task configuration, a user can trigger a task-adding instruction on an operation interface of an application platform, e.g., via a terminal. In response to the task-adding instruction triggered by the user via the terminal, the application platform can perform the task configuration according to the task-adding instruction, and obtain task configuration information. The task configuration information can include application name, type of the application attribute modification, source attribute information and destination attribute information of attribute type corresponding to the application, and/or any other appropriate information.

During actual operation, via various option buttons provided on the operation interface of the application platform, the user can perform the task configuration, and select the application name, the attribute modification type of the application, and/or the source attribute information and the destination attribute information of the attribute type corresponding to the application. Further, as needed, additional option buttons can be provided on the operation interface of the application platform. The additional option buttons can include, e.g., an option button to add source attribute information of the attribute type corresponding to the application to be modified, and/or an option button to add source attribute information and/or destination attribute information of the attribute type corresponding to the application to be modified.

For illustrative purpose, as shown in FIG. 2A, a game name and a merger type can be selected. For example, the game name can be selected to be QQ Faerie, e.g., selected via a drop-down button. The merger type can be selected to be a server merger or a great-region merger, e.g., selected via a check-mark key. Then, attribute information of regions or servers to be merged can be selected. The attribute information can include source attribute information and destination attribute information of the corresponding application. The attribute information can include region name, region ID, server name, server ID, and/or any other appropriate information.

Next, the configuration information can be stored via a merge button. A task for updating an application object attribute can thus be established. That is, in this case, a task for updating region/server attribute in a game can thus be established.

Additional sub-tasks can be added via an 'add merger' button provided on the operation interface of the application platform, e.g., as shown in FIG. 2B. The process for configuring the task configuration information for each task can be similar to or the same as the process of obtaining task configuration information as described above, e.g., as shown in FIG. 2A.

During the process of establishing the task as described above, when multiple regions or servers are to be merged into one region or one server, additional region/server attribute information can be added via an 'add region/server to be merged' button provided on the operation interface of the application platform, e.g., as shown in FIG. 2C.

Furthermore, option buttons for deleting merger, and/or option buttons for deleting region/server to be merged can be provided on the operation interface, in order to prevent false operation of the user or to meet various modification requirements of the user. With the method as disclosed above, a series of tasks can be established, to form a task list, e.g., as shown in FIG. 2D.

During the executing of a task, the extracting-parsing module 202 of the application platform can extract the task from the task list, parse the task configuration information of the task, and obtain the source attribute information and the destination attribute information of the corresponding application. Thus, the finding module 203 can subsequently find all the objects of the corresponding application in a database according to the source attribute information of the corresponding application. Furthermore, the modifying module 204 can modify the source attribute information of all the objects of the corresponding application into the destination attribute information.

After the source attribute information and the destination attribute information of the corresponding application is obtained, the finding module 203 can find all the objects of the corresponding application in the database according to the source attribute information of the corresponding application. Furthermore, the modifying module 204 can modify the source attribute information of all the objects of the corresponding application into the destination attribute information. The writing module 205 can re-write and store, in the database, the destination attribute information after the modification, to be used as the current attribute information of the application objects. Thus, modification of attribute information of the application objects can be completed.

An interface or page during the executing of the task can be, e.g., similar to or the same as shown in FIG. 2D. The interface of the task list can display ID of a task that is currently being executed, application name, task creation time, task type (i.e., type of application attribute modification), task status, and/or other appropriate information. The interface of the task list can provide 'Operation' options for the user to operate. For example, in the 'Operation' options, the user can select a 'back' button to revoke a previous task execution process. Further, via the 'Operation' options, the user can obtain detailed information of execution of the tasks.

The task status can display execution status of the task including, e.g., successful execution, failure returned, or any other appropriate status. In addition, an 'add task' option can be provided on the interface of the task list. Therefore, during the execution of the task, other task(s) that need to be executed can continue to be added.

Figure 7:
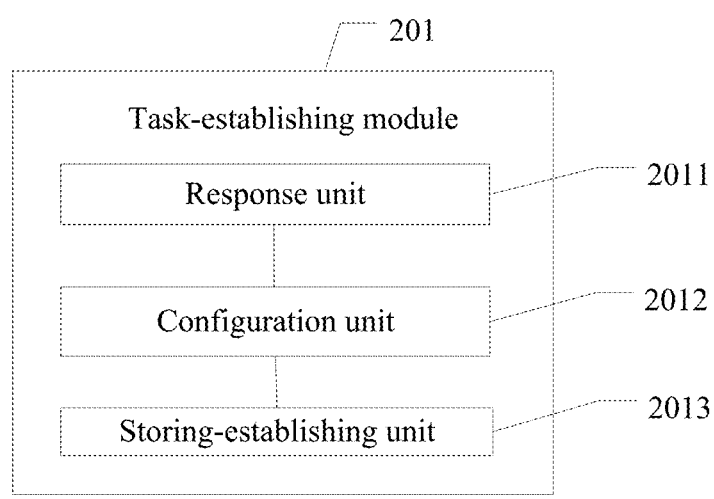
FIG. 7 depicts a structure diagram of a task-establishing module of an exemplary apparatus for updating application object attribute in accordance with various disclosed embodiments.

Further, FIG. 7 depicts a structure diagram of a task-establishing module of an exemplary apparatus for updating application object attribute in accordance with various disclosed embodiments. As shown in FIG. 7, the task-establishing module 201 may include a response unit 2011, a configuration unit 2012, and a storing-establishing unit 2013. Certain units may be omitted and other units may be included.

The response unit 2011 is configured to respond to the task-adding instruction triggered by the user. The configuration unit 2012 is configured to perform the task configuration according to the task-adding instruction, to obtain task configuration information. The task configuration information can include application name, type of application attribute modification, source attribute information and destination attribute information of attribute type corresponding to the application. The storing-establishing unit 2013 is configured to store the task configuration information, to establish the task for updating an application object attribute.

In various embodiments as disclosed above, a task for updating an application object attribute can be established via task configuration. The task can be executed according to task configuration information. Attribute information of application objects can be automatically modified. Thus, efficiency of updating the application object attribute can be improved. In addition, by timely modifying the attribute information of the application objects, the attribute information of the application objects can be maintained consistent with the attribute information within the application. As a result, subsequent transfer of application objects on the application platform can be ensured to be normally performed. Reliability of application operation can thus be improved.

Figure 8:
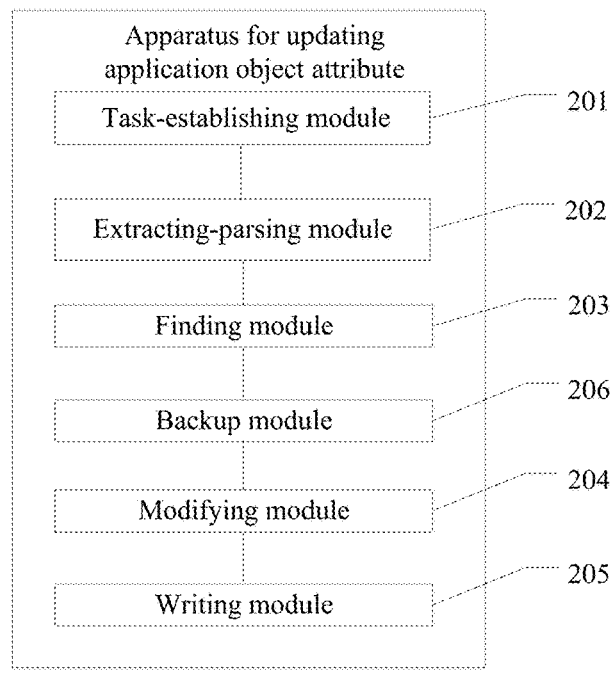
FIG. 8 depicts a structure diagram of functional modules of another exemplary apparatus for updating application object attribute in accordance with various disclosed embodiments.

FIG. 8 depicts a structure diagram of functional modules of another exemplary apparatus for updating application object attribute in accordance with various disclosed embodiments. As shown in FIG. 8, the apparatus as disclosed in various embodiments (e.g., as shown in FIG. 7) can further include a backup module 206. The backup module 206 is configured to back up current attribute information of the corresponding application objects in the database.

In this case, when the application object(s) corresponding to the application are found in the database according to the source attribute information of the application, and before the attribute information of the application objects is modified, current attribute information of the application objects is backed up in the database. Thus, when a Back operation is subsequently needed, the current attribute information of the application objects can be restored based on the backed-up information, to ensure the Back operation can be performed normally.

In various embodiments as disclosed above, a task for updating an application object attribute can be established via task configuration. The task can be executed according to task configuration information. Attribute information of application objects can be automatically modified. Thus, efficiency of updating the application object attribute can be improved. In addition, by timely modifying the attribute information of the application objects, the attribute information of the application objects can be maintained consistent with the attribute information within the application. As a result, subsequent transfer of application objects on the application platform can be ensured to be normally performed. Reliability of application operation can thus be improved.

In addition, when the application object(s) corresponding to the application are found in the database according to the source attribute information of the application, and before the attribute information of the application objects is modified, current attribute information of the application objects is backed up in the database. Thus, when a Back operation is subsequently needed, the current attribute information of the application objects can be restored based on the backed-up information, to ensure the Back operation can be performed normally.

Figure 9:
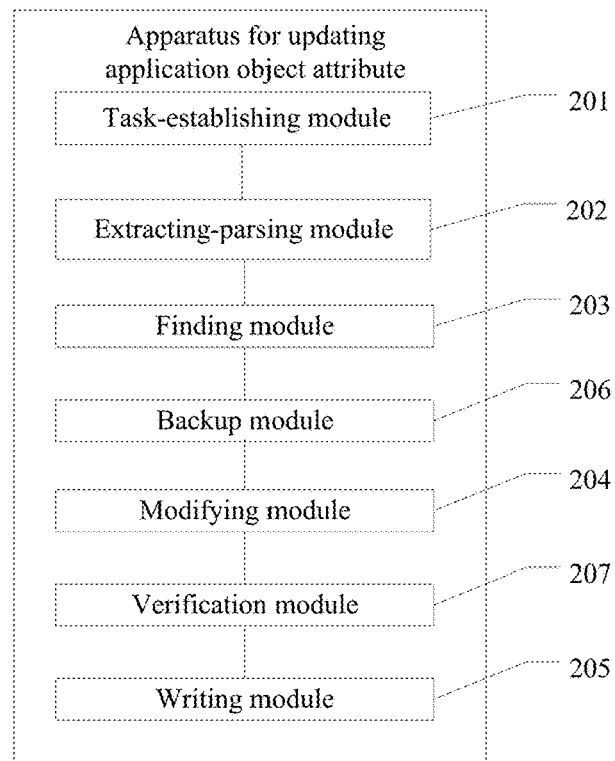
FIG. 9 depicts a structure diagram of functional modules of another exemplary apparatus for updating application object attribute in accordance with various disclosed embodiments.

FIG. 9 depicts a structure diagram of functional modules of another exemplary apparatus for updating application object attribute in accordance with various disclosed embodiments. As shown in FIG. 9, the apparatus as disclosed in various embodiments (e.g., as shown in FIGS. 7-8) can further include a verification module 207. The verification module 207 is configured to verify the destination attribute information.

In this case, after the attribute information of the application objects is modified, the attribute information that is modified into the destination attribute information can be verified, to ensure accuracy of data of the application and further improve the reliability of application operation.

Figure 10:
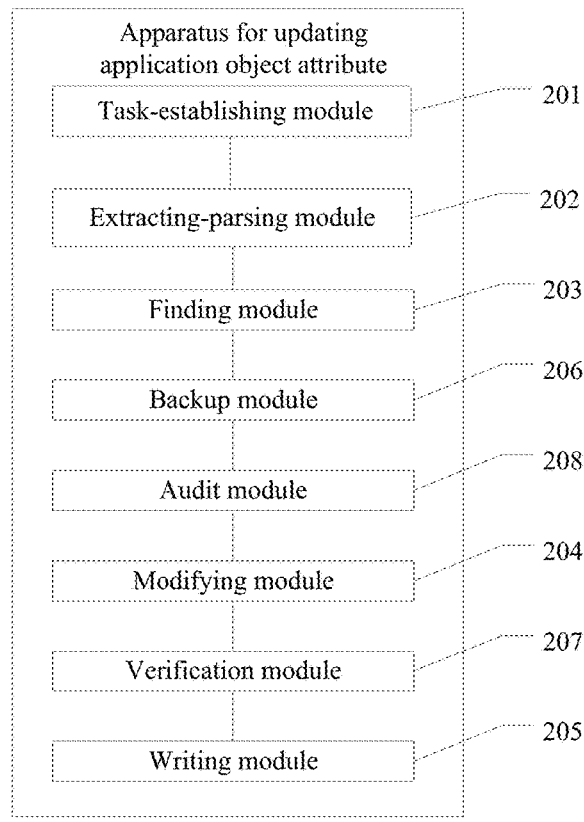
FIG. 10 depicts a structure diagram of functional modules of another exemplary apparatus for updating application object attribute in accordance with various disclosed embodiments.

FIG. 10 depicts a structure diagram of functional modules of another exemplary apparatus for updating application object attribute in accordance with various disclosed embodiments. As shown in FIG. 10, the apparatus as disclosed in various embodiments (e.g., as shown in FIGS. 7-9) can further include an audit module 208. The audit module 208 is configured to audit permission for attribute information modification.

In this case, before the attribute information of the application objects is modified, the permission for attribute information modification can be audited, in order to prevent false operation of information modification and improve security of task operation.

In various embodiments as disclosed above, a task for updating an application object attribute can be established via task configuration. Each task can be executed according to task configuration information. Attribute information of application objects can be automatically modified. Thus, efficiency of updating the application object attribute can be improved. In addition, by timely modifying the attribute information of the application objects, the attribute information of the application objects can be maintained consistent with the attribute information within the application. As a result, subsequent transfer of application objects on the application platform can be ensured to be normally performed. Reliability of application operation can thus be improved.

In addition, an audit mechanism can be introduced into modification of attribute information. Thus, tasks can be performed with greater security, and data security of network applications can be improved accordingly.

Take an online game as an example. The region/server merger of merchandise is usually operated by a developer. First, the developer obtains information of a region/server merger from a carrier. Next, the developer operates a database, backs up data, then manually modifies region/server information of the merchandise, and verifies the region/server information of the merchandise after the modification. Such a manual operating process consumes significant time and labor. In addition, manually operating the database is subject to tremendous data security risks.

Figure 12:
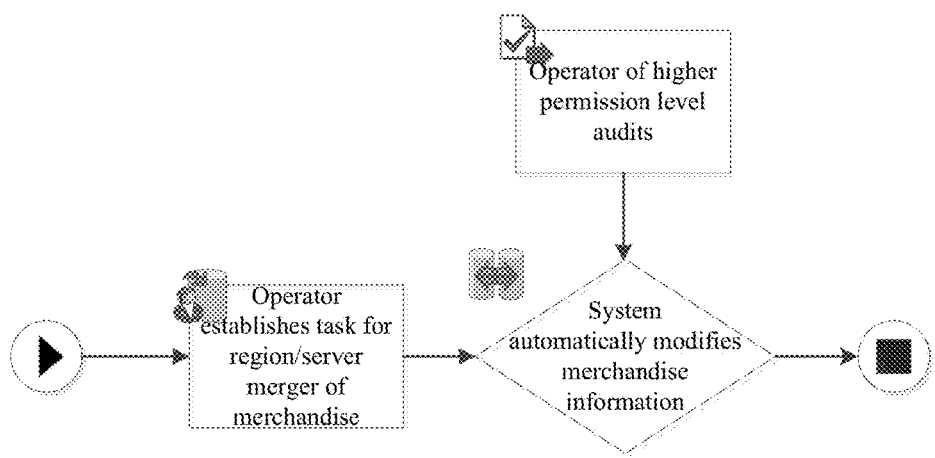
FIG. 12 depicts a flow diagram of another exemplary method for updating application object attribute in accordance with various disclosed embodiments.

Via task configuration and mouse-clicking operations performed by an operator, the disclosed methods can automatically complete region/server merger of merchandise including data backup, data modification, data verification and any other appropriate steps. Furthermore, because the method can include an audit mechanism, the tasks can be executed with greater security. To further illustrate the methods disclosed herein, FIG. 12 depicts a flow diagram of another exemplary method for updating application object attribute in accordance with various disclosed embodiments.

Further, various embodiments provide an application platform. The application platform can include the apparatus as disclosed above (e.g., as in FIGS. 6-10).

In a certain embodiment, the method or process for updating application object attribute can be automatically executed. In an exemplary process, a first operator can add a task for updating an attribute of an application object corresponding to an application. An administrator or second operator having high-level permission can audit permission of the first operator for attribute information modification. Permission of the administrator or second operator need to be at a higher level than permission of the first operator for attribute information modification, in order for of the administrator or second operator to audit the permission for attribute information modification. The system or the application platform can automatically pull merchandise information from a database, according to game name, region or server inputted by the first operator. The merchandise information can be backed up. Merchandise information can refer to attribute information of the merchandise.

Next, the merchandise information can be modified. A string of attributes, i.e., attribute information after the modification, can be formed according to type or classification of merchandise. The merchandise information after the modification can be rewritten or written into the database. The modification of the merchandise information can thus be completed.

Therefore, via inputting information and mouse-clicking operations performed by the first operator, region/server merger of merchandise, including data backup, data modification, and data verification, can be automatically completed. Furthermore, because the process can include an audit mechanism, the tasks can be executed with greater security. Thus, as disclosed above, a process for automating region/server merger of merchandise is provided. A method for accomplishing a process for automating region/server merger of merchandise is also provided.

It should be noted that, as used herein, the terms "include," "comprise," or any other variations thereof, are intended to cover a non-exclusive inclusion, such that a process, method, article, or apparatus that includes a series of elements can not only include those elements, but also include other elements not expressly listed or inherent elements for such a process, method, article, or apparatus. Without further limitation, an element defined by a statement "include one . . . " does not exclude additional identical elements that may be included in the process, method, article, or apparatus that includes the element.

In various embodiments, the methods as disclosed can be implemented by software coupled with certain necessary universal hardware platform. The methods as disclosed can also be implemented by hardware. Part or all of the steps in the methods in accordance with various embodiments can be accomplished using a program/software to instruct related hardware. The program/software can be stored in a non-transitory computer-readable storage medium including, e.g., ROM/RAM, magnetic disk, optical disk, etc. The computer-readable storage medium can include coded instructions to instruct a computer system, e.g., a terminal device or a user terminal, to execute the methods in accordance with various embodiments. The computer system can include, e.g., mobile phone, computer, server, or network equipment, etc. For example, the program instructions corresponding to the apparatus for updating application object attribute as shown in FIGS. 6-10 can be stored in the computer-readable storage medium of the apparatus for updating application object attribute, and be executed by at least one processor of the apparatus for updating application object attribute, in order to implement the methods for updating application object attribute as shown in FIGS. 1-5.

The embodiments disclosed herein are exemplary only. Other applications, advantages, alternations, modifications, or equivalents to the disclosed embodiments are obvious to those skilled in the art and are intended to be encompassed within the scope of the present disclosure.

INDUSTRIAL APPLICABILITY AND ADVANTAGEOUS EFFECTS

Without limiting the scope of any claim and/or the specification, examples of industrial applicability and certain advantageous effects of the disclosed embodiments are listed for illustrative purposes. Various alternations, modifications, or equivalents to the technical solutions of the disclosed embodiments can be obvious to those skilled in the art and can be included in this disclosure.

The disclosed methods and apparatus can be used in a variety of Internet applications including, e.g., managing merchandise information in an online game, or managing transactions or transfer of merchandise in online game trading. Exemplary methods can be implemented by an application platform. By using the disclosed methods, apparatus, and application platforms a task for updating an application object attribute can be established via task configuration. Each task can be executed according to task configuration information. Attribute information of application objects can be automatically modified.

Thus, efficiency of updating the application object attribute can be improved. In addition, by timely modifying the attribute information of the application objects, the attribute information of the application objects can be maintained consistent with the attribute information within the application. As a result, subsequent transfer of application objects on the application platform can be ensured to be normally performed. Reliability of application operation can thus be improved.

In addition, an audit mechanism can be introduced into modification of attribute information. Thus, tasks can be performed with greater security, and data security of network applications can be improved accordingly.

In certain examples, via task configuration and mouse-clicking operations performed by an operator, the disclosed methods can automatically complete region/server merger of merchandise including data backup, data modification, data verification and any other appropriate steps. Furthermore, because the method can include an audit mechanism, the tasks can be executed with greater security.

What is claimed is:

1. A method for updating application object attribute, implemented on an application platform, to facilitate automatic trading an application object on the application platform by a user, the method comprising:

determining, based on releasing activity of a user, the application object to be released on the application platform for trading by the user;
determining, based on a user selection of an application identifier, an application to which the application object is corresponding;
establishing a task for updating attribute information of the application object corresponding to the application, via task configuration;
obtaining task configuration information associated with the updating of the attribute information of the application object;
forming a task list based on the task configuration information;
extracting the task from the task list;
parsing the task configuration information;
obtaining source attribute information and destination attribute information of the application according to the task configuration information, wherein the source attribute information includes at least one of an original region attribute or an original server attribute; and the destination attribute information includes at least one of an updated region attribute or an updated server attribute associated with a corresponding region merger or server merger, a region merger being an operation of merging online services provided to a group of users in the original region with the updated region, a server merger being an operation of merging online services operated by the original server with the updated server;
finding the application object in a database, according to the source attribute information of the application, wherein the application object has current attribute information corresponding to the source attribute information of the application;
modifying the current attribute information of the application object into the destination attribute information; and
after the modifying, writing the destination attribute information into the database as the current attribute information of the application object, wherein the current attribute information of the application object includes at least one of the updated region attribute or the updated server attribute to trade the application object on the application platform after the region merger or the server merger.

2. The method according to claim 1, wherein the establishing of the task for updating the attribute of the application object via the task configuration includes:
responding, by the application platform, to a task-adding instruction triggered by a user;
performing the task configuration according to the task-adding instruction, to obtain the task configuration information, the task configuration information including a name of the application, a type of application attribute modification, and the source attribute information and the destination attribute information of an attribute type corresponding to the application; and
storing the task configuration information, to establish the task for updating the attribute of the application object.

3. The method according to claim 2, wherein the performing of the task configuration to obtain the task configuration information includes:
selecting the name of the application, according to the task-adding instruction;
selecting the type of the application attribute modification; and
selecting the source attribute information and the destination attribute information of the attribute type corresponding to the application.

4. The method according to claim 3, wherein the performing of the task configuration to obtain the task configuration information further includes:
adding to-be-modified source attribute information of the attribute type corresponding to the application; and/or
adding to-be-modified source attribute information and to-be-modified destination attribute information of the attribute type corresponding to the application.

5. The method according to claim 1, further including:
after finding the application object in the database according to the source attribute information of the application, backing up the current attribute information of the application object in the database;
after modifying the current attribute information of the application object into the destination attribute information, verifying the destination attribute information; and
before modifying the current attribute information of the application object into the destination attribute information, auditing permission for attribute information modification.

6. An apparatus for updating application object attribute to facilitate automatic trading an application object on an application platform by a user, comprising:
a task-establishing module configured to, after the application object to be released on the application platform for trading by a user is determined based on releasing activity of the user, and an application to which the application object is corresponding is determined based on a user selection of an application identifier, establish a task for updating attribute information of the application object corresponding to the application, via task configuration, obtain task configuration information associated with the updating of the attribute information of the application object, form a task list based on the task configuration information;
an extracting-parsing module configured to extract the task from the task list, parse the task configuration information, obtain source attribute information and destination attribute information of the application according to the task configuration information, wherein: the source attribute information includes at least one of an original region attribute or an original server attribute; and the destination attribute information includes at least one of an updated region attribute or an updated server attribute associated with a corresponding region merger or server merger, a region merger being an operation of merging online services provided to a group of users in the original region with the updated region, a server merger being an operation of merging online services operated by the original server with the updated server;
a finding module configured to find the application object in a database, according to the source attribute information of the application, wherein the application object has current attribute information corresponding to the source attribute information of the application;
a modifying module configured to modify the current attribute information of the application object into the destination attribute information; and
a writing module configured to write the destination attribute information into the database after the modifying as the current attribute information of the application object, wherein the current attribute information of the application object includes at least one of the updated region attribute or the updated server attribute to trade the application object on the application platform after the region merger or the server merger.

7. The apparatus according to claim 6, wherein the task-establishing module includes:
 a response unit configured to respond to a task-adding instruction triggered by a user;
 a configuration unit configured to perform the task configuration according to the task-adding instruction, to obtain the task configuration information, the task configuration information including a name of the application, a type of application attribute modification, and the source attribute information and the destination attribute information of an attribute type corresponding to the application; and
 a storing-establishing unit configured to store the task configuration information, to establish the task for updating the attribute of the application object.

8. The apparatus according to claim 7, wherein the configuration unit is further configured to:
 select the name of the application, according to the task-adding instruction;
 select the type of the application attribute modification; and
 select the source attribute information and the destination attribute information of the attribute type corresponding to the application.

9. The apparatus according to claim 8, wherein the configuration unit is further configured to:
 add to-be-modified source attribute information of the attribute type corresponding to the application; and/or
 add to-be-modified source attribute information and to-be-modified destination attribute information of the attribute type corresponding to the application.

10. The apparatus according to claim 6, further including:
 a backup module configured to back up, in the database, the current attribute information of the application object;
 a verification module configured to verify the destination attribute information; and
 an audit module configured to audit permission for attribute information modification.

11. A non-transitory computer-readable medium having computer program for, when being executed by a processor, performing a method for updating application object attribute, implemented on an application platform, to facilitate automatic trading an application object on the application platform by a user, the method comprising:
 determining, based on releasing activity of a user, the application object to be released on the application platform for trading by the user;
 determining, based on a user selection of an application identifier, an application to which the application object is corresponding;
 establishing a task for updating attribute information of the application object corresponding to the application, via task configuration;
 obtaining task configuration information associated with the updating of the attribute information of the application object;
 forming a task list based on the task configuration information;
 extracting the task from the task list;
 parsing the task configuration information;
 obtaining source attribute information and destination attribute information of the application according to the task configuration information, wherein the source attribute information includes at least one of an original region attribute or an original server attribute; and the destination attribute information includes at least one of an updated region attribute or an updated server attribute associated with a corresponding region merger or server merger, a region merger being an operation of merging online services provided to a group of users in the original region with the updated region, a server merger being an operation of merging online services operated by the original server with the updated server;
 finding the application object in a database, according to the source attribute information of the application, wherein the application object has current attribute information corresponding to the source attribute information of the application;
 modifying the current attribute information of the application object into the destination attribute information; and
 after the modifying, writing the destination attribute information into the database as the current attribute information of the application object, wherein the current attribute information of the application object includes at least one of the updated region attribute or the updated server attribute to trade the application object on the application platform after the region merger or the server merger.

12. The non-transitory computer-readable medium according to claim 11, wherein the establishing of the task for updating the attribute of the application object via the task configuration includes:
 responding, by the application platform, to a task-adding instruction triggered by a user;
 performing the task configuration according to the task-adding instruction, to obtain the task configuration information, the task configuration information including a name of the application, a type of application attribute modification, and the source attribute information and the destination attribute information of an attribute type corresponding to the application; and
 storing the task configuration information, to establish the task for updating the attribute of the application object.

13. The non-transitory computer-readable medium according to claim 12, wherein the performing of the task configuration to obtain the task configuration information includes:
 selecting the name of the application, according to the task-adding instruction;
 selecting the type of the application attribute modification; and
 selecting the source attribute information and the destination attribute information of the attribute type corresponding to the application.

14. The non-transitory computer-readable medium according to claim 13, wherein the performing of the task configuration to obtain the task configuration information further includes:
 adding to-be-modified source attribute information of the attribute type corresponding to the application; and/or
 adding to-be-modified source attribute information and to-be-modified destination attribute information of the attribute type corresponding to the application.

15. The non-transitory computer-readable medium according to claim 11, the method further including:
 after finding the application object in the database according to the source attribute information of the application, backing up the current attribute information of the application object in the database;

after modifying the current attribute information of the application object into the destination attribute information, verifying the destination attribute information; and before modifying the current attribute information of the application object into the destination attribute information, auditing permission for attribute information modification.

16. The method according to claim 1, wherein the application platform is an online game platform; the application is a game; and the application object is a merchandise to be traded within the game on the online game platform.

* * * * *